US006496844B1

United States Patent
Hetherington et al.

(10) Patent No.: US 6,496,844 B1
(45) Date of Patent: Dec. 17, 2002

(54) METHOD, SYSTEM AND COMPUTER PROGRAM PRODUCT FOR PROVIDING A USER INTERFACE WITH ALTERNATIVE DISPLAY LANGUAGE CHOICES

(75) Inventors: David James Hetherington, Austin, TX (US); David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,810

(22) Filed: Dec. 15, 1998

(51) Int. Cl.⁷ .............................. G06F 17/21
(52) U.S. Cl. ...................... 707/536; 707/526
(58) Field of Search .............. 707/536, 501.1, 707/526; 704/8; 345/703, 708, 808, 809

(56) References Cited

U.S. PATENT DOCUMENTS

| 4,379,288 A | 4/1983 | Leung et al. |
|---|---|---|
| 4,384,329 A | 5/1983 | Rosenbaum et al. |
| 4,544,276 A | 10/1985 | Horodeck |
| 4,611,280 A | 9/1986 | Linderman |
| 4,615,002 A | 9/1986 | Innes |
| 4,641,264 A | 2/1987 | Nitta et al. |
| 4,706,212 A | 11/1987 | Toma |
| 4,730,270 A | 3/1988 | Okajima et al. |
| 4,737,040 A | 4/1988 | Moon |
| 4,951,202 A | 8/1990 | Yan |
| 4,954,984 A | 9/1990 | Kaijima et al. |
| 4,962,452 A | 10/1990 | Nogami et al. |
| 5,040,218 A | 8/1991 | Vitale et al. |
| 5,056,021 A | 10/1991 | Ausborn |
| 5,091,878 A | 2/1992 | Nagasawa et al. |

(List continued on next page.)

FOREIGN PATENT DOCUMENTS

| EP | 0640913 A2 | 3/1995 |
|---|---|---|
| WO | WO 97/40452 A1 | 10/1997 |
| WO | WO 97/40453 A1 | 10/1997 |

OTHER PUBLICATIONS

Davis, Carl, HTML Editor Reviews ReVol Web Worker 1.2, 1996, http://www.webcommando.com/editrev/editors/revol.html.*

(List continued on next page.)

*Primary Examiner*—Stephen S. Hong
(74) *Attorney, Agent, or Firm*—Jeffrey S. LaBaw; Bracewell & Patterson, L.L.P.

(57) ABSTRACT

A user control is provided to selectively display and/or edit the contents of any field within a multi-field text string object having separate fields each containing a different representation of a text string (e.g., Kanji symbols, syllabary characters phonetically spelling the Kanji symbols, and latin characters phonetically spelling the Kanji symbols). The various fields thus encapsulate identification, meaning, and pronunciation information for a single text string. A controller interface between the user control and the multi-field text string object allows methods within the user control to be performed on the multi-field text string object. Contents of the currently selected display field for the multi-string text string object are displayed, together with a selection control. The selection control may be actuated to display an ordered list of the contents of all fields within the multi-field text string object, and the current display field altered by selecting a field from the displayed list. A user unable to recognize, understand, or pronounce a text string based on one representation of a text string may thus switch views to a different representation of the same text string familiar to the user. Contents of the currently selected display field may also be edited.

21 Claims, 6 Drawing Sheets

U.S. PATENT DOCUMENTS

| | | |
|---|---|---|
| 5,109,352 A | 4/1992 | O'Dell et al. |
| 5,136,503 A | 8/1992 | Takagi et al. |
| 5,146,587 A | 9/1992 | Francisco |
| 5,164,900 A | 11/1992 | Bernath |
| 5,175,803 A | 12/1992 | Yeh |
| 5,214,583 A | 5/1993 | Miike et al. |
| 5,243,519 A | 9/1993 | Andrews et al. |
| 5,251,130 A | 10/1993 | Andrews et al. |
| 5,268,990 A | 12/1993 | Cohen et al. |
| 5,307,267 A | 4/1994 | Yang |
| 5,339,433 A | 8/1994 | Frid-Nielsen |
| 5,371,844 A | 12/1994 | Andrew et al. ............. 395/155 |
| 5,377,317 A | 12/1994 | Bates et al. ................. 395/157 |
| 5,384,700 A | 1/1995 | Lim et al. |
| 5,390,295 A | 2/1995 | Bates et al. ................. 395/157 |
| 5,416,903 A | 5/1995 | Malcolm |
| 5,418,718 A | 5/1995 | Lim et al. |
| 5,420,976 A | 5/1995 | Schell et al. ................ 395/159 |
| 5,426,583 A | 6/1995 | Uribe-Echebarria Diaz De Mendibil |
| 5,432,948 A | 7/1995 | Davis et al. |
| 5,434,776 A | 7/1995 | Jain |
| 5,434,777 A | 7/1995 | Luciw |
| 5,440,482 A | 8/1995 | Davis |
| 5,448,474 A | 9/1995 | Zamora |
| 5,485,373 A | 1/1996 | Davis et al. ........... 364/419.13 |
| 5,490,061 A | 2/1996 | Tolin et al. |
| 5,523,946 A | 6/1996 | Kaplan et al. |
| 5,546,575 A | 8/1996 | Potter et al. |
| 5,550,965 A | 8/1996 | Gabbe et al. ............... 395/154 |
| 5,583,761 A | 12/1996 | Chou |
| 5,594,642 A | 1/1997 | Collins et al. |
| 5,600,779 A | 2/1997 | Palmer et al. |
| 5,613,122 A | 3/1997 | Burnard et al. |
| 5,640,581 A | 6/1997 | Saraki |
| 5,640,587 A | 6/1997 | Davis et al. |
| 5,642,490 A | 6/1997 | Morgan et al. ............. 395/342 |
| 5,644,775 A | 7/1997 | Thompson et al. |
| 5,649,223 A | 7/1997 | Freeman |
| 5,652,884 A | 7/1997 | Palevich |
| 5,675,818 A | 10/1997 | Kennedy |
| 5,677,835 A | 10/1997 | Carbonell et al. |
| 5,678,039 A | 10/1997 | Hinks et al. |
| 5,682,158 A | 10/1997 | Edberg et al. |
| 5,721,825 A | 2/1998 | Lawson et al. |
| 5,724,593 A | 3/1998 | Hargrave, III et al. |
| 5,734,887 A | 3/1998 | Kingberg et al. |
| 5,758,295 A | 5/1998 | Ahlberg et al. |
| 5,758,314 A | 5/1998 | McKenna |
| 5,778,356 A * | 7/1998 | Heiny ..................... 707/104.1 |
| 5,784,069 A | 7/1998 | Daniels et al. |
| 5,784,071 A | 7/1998 | Tang et al. |
| 5,787,452 A | 7/1998 | McKenna |
| 5,799,303 A | 8/1998 | Tsuchimura |
| 5,802,539 A * | 9/1998 | Daniels et al. ................. 704/7 |
| 5,812,122 A * | 9/1998 | Ng .............................. 345/703 |
| 5,812,964 A | 9/1998 | Finger ........................... 704/7 |
| 5,815,148 A | 9/1998 | Tanaka |
| 5,828,992 A | 10/1998 | Kusmierczyk |
| 5,832,478 A | 11/1998 | George |
| 5,844,798 A | 12/1998 | Uramoto |
| 5,870,084 A | 2/1999 | Kanungo et al. |
| 5,872,973 A | 2/1999 | Mitchell et al. |
| 5,873,111 A | 2/1999 | Edberg |
| 5,917,484 A * | 6/1999 | Mullaney .................... 345/703 |
| 5,966,637 A | 10/1999 | Kanungo et al. |
| 5,974,372 A * | 10/1999 | Barnes et al. ............... 345/703 |
| 5,978,754 A | 11/1999 | Kumano |
| 5,995,101 A | 11/1999 | Clark et al. |
| 6,003,049 A | 12/1999 | Chiang |
| 6,024,571 A | 2/2000 | Renegar |
| 6,028,600 A | 2/2000 | Rosin et al. |
| 6,047,252 A | 4/2000 | Kumano et al. |
| 6,078,935 A | 6/2000 | Nielsen |
| 6,092,037 A | 7/2000 | Stone et al. |
| 6,144,377 A | 11/2000 | Oppermann et al. |
| 6,167,366 A | 12/2000 | Johnson |
| 6,205,418 B1 * | 3/2001 | Li et al. ........................ 704/8 |
| 6,219,632 B1 | 4/2001 | Schumacher et al. |
| 6,229,622 B1 * | 5/2001 | Takeda ..................... 358/1.13 |
| 6,252,586 B1 | 6/2001 | Rettig et al. |
| 6,321,191 B1 | 11/2001 | Kurahashi |
| 6,332,148 B1 * | 12/2001 | Paine et al. ................. 707/512 |

OTHER PUBLICATIONS

U.S. patent application Ser. No. 09/211,809, Hetherington et al., filed Dec. 15, 1998.
U.S. patent application Ser. No. 09/211,808, Hetherington et al., filed Dec. 15, 1998.
U.S. patent application Ser. No. 09/211,803, Hetherington et al., filed Dec. 15, 1998.
U.S. patent application Ser. No. 09/211,799, Hetherington et al., filed Dec. 15, 1998.
U.S. patent application Ser. No. 09/211,802, Hetherington et al., filed Dec. 15, 1998.
U.S. patent application Ser. No. 09/211,813, Hetherington et al., filed Dec. 15, 1998.
U.S. patent application Ser. No. 09/211,801, Hetherington et al., filed Dec. 15, 1998.
U.S. patent application Ser. No. 09/211,812, Hetherington et al., filed Dec. 15, 1998.
Baldwin, H. *Object–Oriented Development: Multicultural C++ Tools Get Internationalization, Thread Safety*. Open Systems Today, vol. —, No. 132, p. 56 (reprinted), Sep./1993.

* cited by examiner

西

林

菅野

METHOD, SYSTEM AND COMPUTER PROGRAM PRODUCT FOR PROVIDING A USER INTERFACE WITH ALTERNATIVE DISPLAY LANGUAGE CHOICES

RELATED APPLICATIONS

The present invention is related to the subject matter of the following commonly assigned, copending United States patent applications: Ser. Nos. 09/211,809; 09/211,808; 09/211,803; 09/211,799; 09/211,802; 09/211,813; 09/211,801; and 09/211,812. The content of the above-referenced applications is incorporated herein by reference.

BACKGROUND OF THE INVENTION

1. Technical Field

The present invention relates in general to altering user interface display of text strings and in particular to altering user interface display of multi-field text string objects. Still more particularly, the present invention relates to selectively displaying any field from a multi-field text string object within a user interface display.

2. Description of the Related Art

Multinational companies often run information system (IS) networks which span multiple locales spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

Central management of such a global network may be difficult or impossible when abstract object names utilize the local language and the local language's underlying character set. For offices located in Egypt, abstract objects would most naturally be named in Arabic; offices in Russia would name objects utilizing the Cyrillic character set; and for offices in Japan, objects would be named in Japanese. A problem arises, however, when a enterprise's headquarters IS staff attempts to examine these objects. The IS staff at the multinational headquarters located in the United States is unlikely to be able to read Arabic or Japanese, or even recognize Cyrillic characters.

Japanese, for example, is a logosyllabic or ideographic language which does not have an alphabet representing simple sounds, but instead has a very large character set with symbols ("ideographs") corresponding to concepts and objects rather than simple sounds. For instance, the Joyo Kanji List (Kanji for Daily Use) adopted for the Japanese language in 1981 includes 1945 symbols. Users unfamiliar with the Kanji characters will have difficulty identifying a particular abstract object named in Japanese, as well as difficulty even discussing such abstract objects over the telephone with an English- and Japanese-speaking counterpart.

Additionally, merely seeing an ideograph may provide no clue as to the correct meaning or pronunciation since, in Japanese, the same character may have multiple meanings or pronunciations. For instance, the character depicted in FIG. 7A may mean either "West" or "Spain"; the symbol depicted in FIG. 7B may be pronounced either "hayashi" or "rin" (or "lin"); and the characters depicted in FIG. 7C may be pronounced "suga no," "suga ya," "kan no," or "kan ya." This circumstance is based in part on the history of the Japanese language, in which the Kanji characters were adopted from the Chinese language. Thus, for example, the "rin" symbol depicted in FIG. 7B is On-Yomi, basically a simulation of the Chinese pronunciation when the character was imported to Japan, while "hayashi" is Kun-Yomi, a Japanese word assigned to the character which has the same meaning.

It would be desirable, therefore, to provide mechanism for selectively controlling the display language of text strings in a user interface. It would further be advantageous if the mechanism permitted the user to change the display language of a user interface and edit the contents of any display field.

SUMMARY OF THE INVENTION

It is therefore one object of the present invention to provide a method, system and computer program product for s altering user interface display of text strings.

It is another object of the present invention to provide a method, system and computer program product for altering user interface display of multi-field text string objects.

It is yet another object of the present invention to provide a method, system and computer program product for selectively displaying any field from a multi-field text string object within a user interface display.

The foregoing objects are achieved as is now described. A user control is provided to selectively display and/or edit the contents of any field within a multi-field text string object having separate fields each containing a different representation of a text string (e.g., Kanji symbols, syllabary characters phonetically spelling the Kanji symbols, and latin characters phonetically spelling the Kanji symbols.). The various fields thus encapsulate identification, meaning, and pronunciation information for a single text string. A controller interface between the user control and the multi-field text string object allows methods within the user control to be performed on the multi-field text string object. Contents of the currently selected display field for the multi-string text string object are displayed, together with a selection control. The selection control may be actuated to display an ordered list of the contents of all fields within the multi-field text string object, and the current display field altered by selecting a field-from the displayed list. A user unable to recognize, understand, or pronounce a text string based on one representation of a text string may thus switch views to a different representation of the same text string familiar to the user. Contents of the currently selected display field may also be edited.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 7A, 7B, 7C:
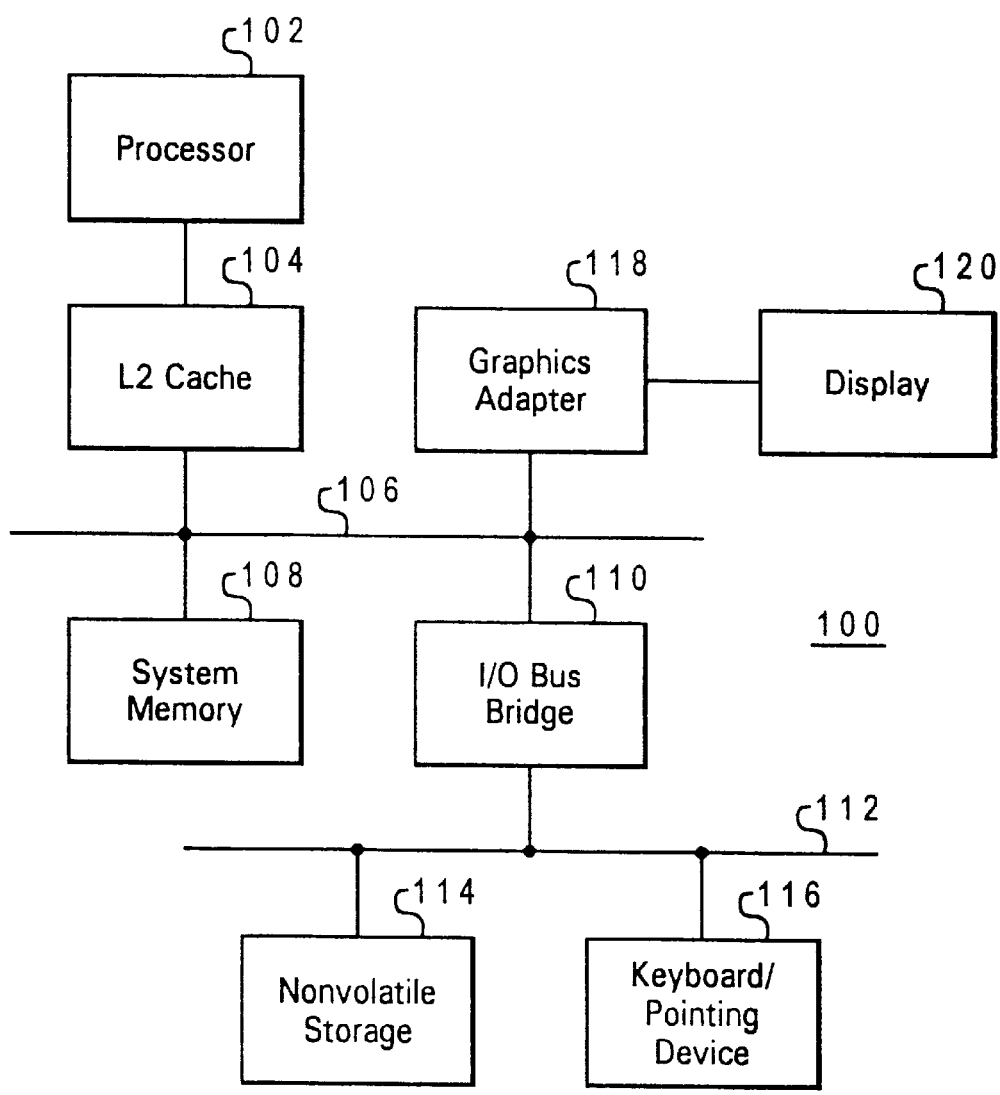
FIG. 1 depicts a diagram of a data processing system in which a preferred embodiment of the present invention may be implemented.
FIGS. 7A–7C depict ideographs having multiple meanings or pronunciations.

With reference now to the figures, and in particular with reference to FIG. 1, a block diagram of a data processing system in which a preferred embodiment of the present invention may be implemented is depicted. Data processing system 100 may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
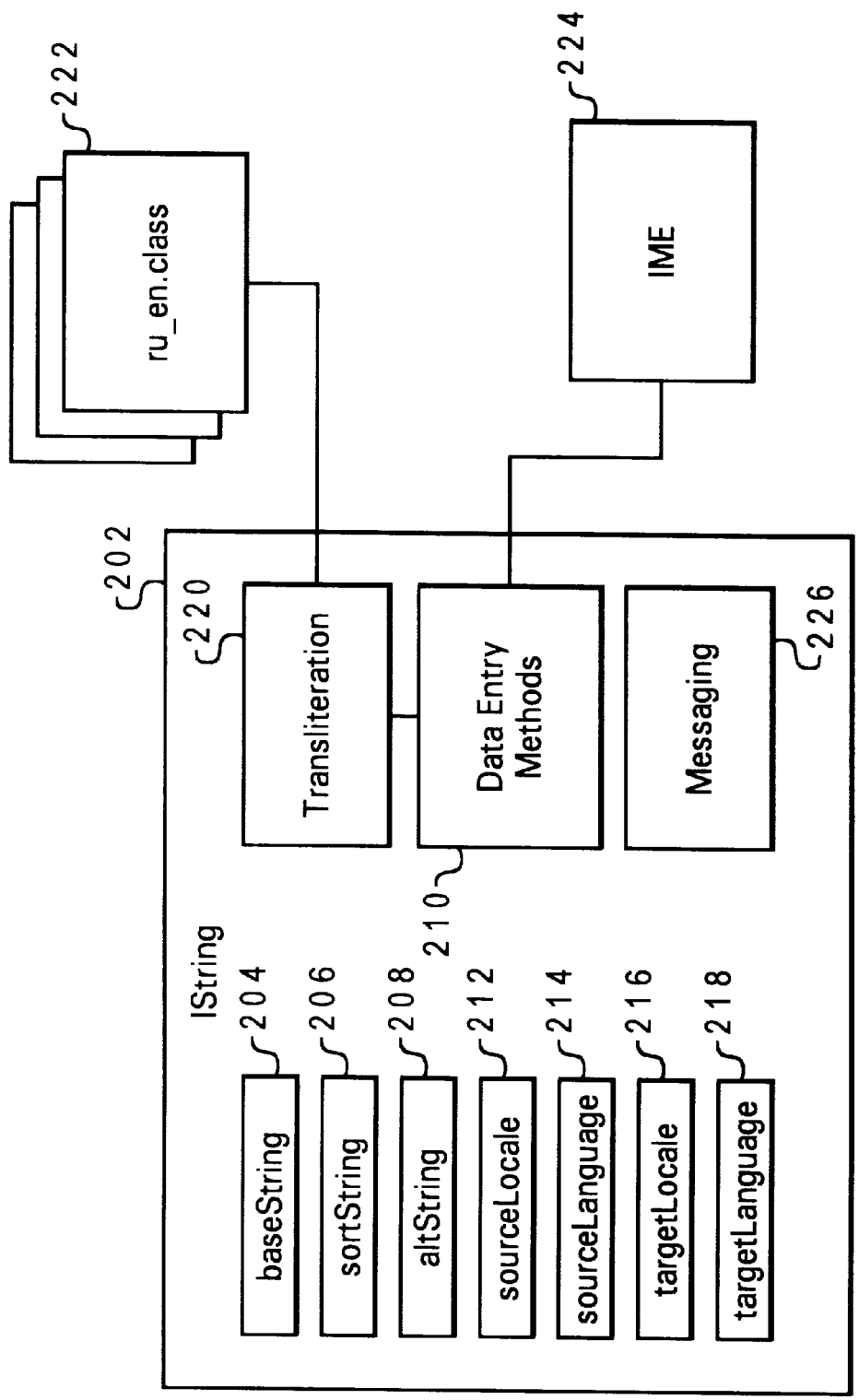
FIG. 2 is a diagram of a multi-field text string class employed in providing a user interface with alternative display language choices in accordance with a preferred embodiment of the present invention.

Referring to FIG. 2, a diagram of a multi-field text string class employed in providing a user interface with alternative display language choices in accordance with a preferred embodiment of the present invention is depicted. A fundamental problem in multinational computing environments which need to display data in multiple human languages is that a spoken word generally encapsulates information in multiple aspects or attributes, such as through the word's meaning, from context, and/or from inflection. When reduced to a visual or electronic representation for manipulation or display in a data processing system, the word may lose some attributes and much of the associated meaning. Most importantly for data processing systems, a visual representation of a word may give no clues as to the correct translation or pronunciation of the word or the proper placement of a word within a specified sort order. International String ("IString") class 202 may be employed to address this problem.

IString class 202 is preferably a Java class similar to the Java String class, which behaves like the String class by including similar methods. Most of the original behavior of the String class should be preserved, with additional functionality added and utilized only as needed. IString class 202 is a datatype which captures some of the meaning of spoken words which is normally lost when the word is reduced to a visual representation. IString class 202 is preferably utilized for all object names and system messages within a system.

The IString class 202 structure includes three different strings for each name, message, data, or text object: a baseString 204, a sortString 206, and an altString 208. BaseString 204 is the string within IString class 202 employed by default in the user interface display and may contain any text, usually the original text entered by the user in the local language where the IString object is created. SortString 206 may also be any text and is employed to allow correct sorting of non-phonetic languages and languages which are difficult to sort based only on the binary value of baseString 204. AltString 208 may be any text but should conventionally be filled with a latin character set representation of the pronunciation of the data contained in baseString 204. Thus, IString class 202 includes the original text (baseString 204), a sort key (sortString 206), and a pronunciation key (altString 208) for object names, system messages, and other data.

When implemented in Java, a constructor for an IString class 202 object may be composed of the following fields:

/** The base text String */
protected String baseString;
/** The related text String for proper collation */
protected String sortString;
/** The related alternate text String (pronunciation key) */
protected String altString;
/** The source locale, as an ISO-3166 code; used for collation */
protected String sourceLocale;
/** The source language, as an ISO-639 code */
protected String sourceLanguage;
/** The source variant defined for EBCIDIC and case mapping */
protected String sourceVariant;
/** The target locale, as an ISO-3166 code */
protected String targetLocale;
/** The target language, as an ISO-639 code */
protected String targetLanguage;
/** The target variant defined for EBCIDIC and case mapping */
protected String targetVariant;

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 202 looks when represented as a table:

TABLE I

| Field | Type | Data |
| --- | --- | --- |
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| sourceVariant | Java String | Variant code |
| targetLocale | Java String | ISO-3166 code, example "JP" |
| targetLanguage | Java String | ISO-639 code, example "ja" |
| targetVariant | Java String | Variant code |

A Java constructor for a new, empty IString class object 202 where the contents are independent of language or locale may be:

```
/***********************************************
 *
 * <P> </P>
 *
 * <dt> <b> Description: </b> <dd>
 * <p> Allocate a new IString containing no characters in
 *     the default
 * locale. </p>
 *
 ***********************************************
public IString( ) {
    this.baseString=new String( );
    this.sortString=new String( );
    this.altString=new String( );
    init( );
}
```

To allow objects of the IString class 202 datatype to be stored in an Object Database (OD8), however, and to permit manipulation of IString data by Common Object Request Broker Architecture (CORBA) applications, an Interface Definition Language (IDL) class should be defined:

```
struct IString{
string baseString; //base test String
string sortString; //related text String for collation
string altString;  //related alternate text String
    (pronunciation)
string sourceLocale; //source locale as an ISO-3166 code
string sourceLanguage; //source language as an ISO-639
    code
string sourceVariant; //source variant code
string targetLocale; //target locale as an ISO-3166 code
string targetLanguage; //target language as an ISO-639
    code
string targetVariant; //target variant code
}
```

The contents of baseString 204, sortString 206, and altString 208 are preferably but not necessarily Unicode text entered by data entry methods 210 within IString class 202. Dataentry methods 210, and thus the contents of baseString 204, sortString 206, and altString 208, may depend at least in part on language and locale parameters defined by source-Locale field 212, sourceLanguage field 214, targetLocale field 216, and targetLanguage 218.

Because data entry methods 210 are dependent on the locale and/or langauge employed by the underlying host system, creation of a new IString object 202 preferably results in the locale and language properties of the host system in which the IString object 202 is created being placed in sourceLocale field 212 and sourceLanguage field 214. A constructor for allocating a new, empty IString for a specified locale and language determined from the host system in which the IString class object 202 is being created may be:

```
/***********************************************
 *
 * <P> </P>
 *
 * <dt> <b> Description: </b> <dd>
 * <p> Allocate a new IString containing no characters in
 *     the
 * specified locale.</p>
 *
 ***********************************************
public IString(Locale loc) {
    this.baseString=new String( );
    this.sortString=new String( );
    this.altString=new String( );
    this.sourceLocale=loc.getLocale( );
    this.sourceLanguage=loc.getLanguage( );
    init( );
}
```

Input of data into an IString class 202 object is preferably locale- or language-dependent. The source-Language and targetLanguage properties 214 and 218 control how data is input into an IString class object 202 by data input methods 210. The sourceLanguage property 214 may be set to the language property of the host system on which the IString class object is created. The targetLanguage property 218 may also be set to that language, or may alternatively be set to a common, "universal" language such as English. Data input methods 210 compare sourceLanguage and targetLanguage properties 214 and 218 to determine what is entered into baseString 204, sortString 206, and altString 208 in an IString class object 202.

Character strings are entered into the baseString 204, sortString 206, and altString 208 fields by data input methods 220 for IString class 202, which may selectively utilize data from either the user's direct entry or specification, from transliteration engine 220, or from the Input Method Editor (IME) 224. Where the targetLanguage property 218 is set to English as a default, data entry methods 210 determine the contents of baseString 204, sortString 206, and altString 208 fields based upon the character set employed by the language in which data is entered by the user (sourceLanguage property 214).

For languages which employ the latin character set, the user input is placed by data entry methods 220 into all three fields (baseString 204, sortString 206, and altString 208) of the IString class 202 by data entry methods 210. A suitable constructor may be:

```
/***********************************************
 *
 * <P<P> </P>
 *
 * <dt> <b> Description: </b> <dd>
```

```
* <p> Allocate a new IString which contains the same
  sequence of
* characters as the string argument in the specified locale.
  </p>
*
*************************************************
  public IString(String str, Locale loc) {
    this.baseString=new String(str);
    this.sortString=new String(str);
    this.altString=new String(str);
    this.sourceLocale=loc.getLocale( );
    this.sourceLanguage=loc.getLanguage( );
    init( );
  }
```

For most locales and languages, the entered string will be input into all three fields of the IString object 202. If targetLanguage property 218 were not set to English, data entry methods 224 would input the user-entered text into all three fields whenever the languages identified in source-Language and targetLanguage properties 214 and 218 employ a common character set (e.g., both employ latin characters, as in the case of Spanish and Afrikaans).

Table II illustrates how data is entered into IString class 202 fields where the host language and locale utilize the latin character set.

TABLE II illustrates how data is entered into IString class 202 fields where the host language and locale utilize the latin character set.

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA__ Hetherington") into sortString 206.

For languages which do not employ the latin character set, but which utilize a character set which may be sound mapped to the latin character set, the user input is entered by data entry methods 210 into baseString 204 and sortString 206, but a transliterated, phonetic representation of the input is placed in altString 208. An internal method within the transliteration engine 220 is employed to sound-map the passed string to a phonetic, latin character representation for altString 208 to transliterate entered characters into other characters understandable to people who are not familiar with the character set of the original language.

To generate the contents of altString 208, transliteration engine 220 selects an appropriate Java resource file 222 containing a mapping table to create the alternate text to be placed in altString 208. The selection of the particular resource file which is employed based on the combination of source and target languages. Java resource files 222 are named for the combination of languages for which the mapping is being performed. In the example shown in FIG. 2, ru_en.class is for mapping Russian (Cyrillic characters) to English (Latin characters). The structure of resource file 222 is a table with associated entries for foreign language characters and corresponding latin characters.

A suitable constructor for an IString object in which altString 208 is transliterated from the passed string may be:

```
/***********************************************
*
* <P> </P>
*
* <dt> <b> Description: </b> <dd>
* <p> Allocate a new IString. The baseString and sort-
    String are the
* passed string, the altString is transliterated into the
    target
* language.</p>
*
************************************************
public IString(String str) {
    this.baseString=new String(str);
    this.sortString=new String(str);
    if(isSameLanguage(( )
        this.altString=new String(str);
    else
        this.altString=transmrogrify(str,
            this.sourceLanguage,
            this.targetLanguage);
}
```

The "transmogrify" method is the internal method within transliteration engine 220 which was described above. The character set into which the entered characters are transliterated is determined from the targetLanguage property 218, which in the exemplary embodiment is assumed to be set to English. Given an appropriate resource file 222, however, characters may be transliterated between any two languages for which characters in one language sound-map to one or more characters in the other.

Table III illustrates how data is entered into IString class 202 by data entry methods 210 where the language utilizes a non-latin character set which maps to the latin character set, such as Russian Cyrillic.

TABLE III

| Field | Type | Data |
|---|---|---|
| baseString | Java String | Дэвид Кумгир |
| sortString | Java String | Дэвид Кумгир |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString, 204 and sortString 206, but the text entered into altString 208 is selected by transliteration engine 220 utilizing a resource table of Russian Cyrillic to English character sound mappings. The phonetic representation of the baseString 204 is thus entered into altString 208 as a pronunciation key for users unfamiliar with the Cyrillic character set.

For languages which do not employ the latin character set or a character set which may be sound-mapped to the latin character set, data entry methods 210 input data into the baseString 204, sortString 206, and altString 208 fields which is derived from the input method editor (IME) 224. IME 224 may be either a customized input method editor or the input method editor which is integrated into Asian versions of the Windows NT operating system available from Microsoft Corporation of Redmond Washington. If the Windows NT input method editor is employed, the appropriate data must be extracted from the Windows NT input method editor internal data storage.

Table IV illustrates how data is entered into IString class 202 by data entry methods 210 for logosyllabic languages, such as Japanese, which employ neither the latin character set nor a character set which may be sound-mapped to the latin character set.

TABLE IV

| Field | Type | Data |
|---|---|---|
| baseString | Java String | <Kanji> |
| sortstring | Java String | はし |
| altString | Java String | hayashi |
| sourceLocale | Java String | Jp |
| sourceLanguage | Java String | ja |
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 208 is the latin characters typed by the user to compose the desired ideograph. The data entered into sortString 206 are the syllabary characters phonetically spelling the desired ideograph, providing an intermediate representation of the ideograph. The data entered into baseString 204 is the final ideograph selected by the user. As with transliteration of non-latin characters as described above, non-latin characters may be entered into altString 208 if the targetLanguage property is set to a language other than English and IME 224 supports composition of the ideographs by phonetic spelling in a language other than English. For instance, an IString object 202 might contain Japanese Kanji in baseString 204, hiragana in sortString 206, and Cyrillic characters in altString 208 if IME 224 permits composition of Japanese Kanji characters by phonetic spelling in Russian.

A suitable constructor for receiving baseString 204, sortString 206 and altString 208 from IME 224 via data entry methods 210 for entry into an IString object 202 may be:

```
/************************************************
*
* <P> </P>
*
* <dt> <b> Description: </b> <dd>
* <p> Allocate a new IString. The baseString, sortString and
* altString are entered from the IME utilizing the default language and
* locale. </p>
*
************************************************ public IString(String base,
    String sort,
    String alt,
    Locale src,
    Locale tgt) {
  this.baseString=base;
  this.sortString=sort;
  this.altString=alt;
  this.sourceLocale=src.getLocale( );
  this.sourcelanguage=src.getLanguage( );
  this.targetlocale=tgt.getLocale( );
  this.targetLanguage=tgt.getLanguage( );
  init( );
}
```

The contents of baseString 204, sortString 206 and altString 208 are entered into the respective fields from data derived from IME 224, while the contents of sourceLocale 212 and sourceLanguage 214 are entered from the default locale and language properties specified by the host system in which data is being entered into IString object 202. The contents of targetLocale 216 and targetLanguage 218 will typically be a locale/language code for a language utilizing the latin character set such as "en_US" (English—United States).

Regardless of the language in which text is entered into an IString class object 202, the data automatically entered into each of the baseString 204, altString 206, and sortString 208 by data entry methods 210 may be overridden or altered using other methods. The fields of an IString object 202 may preferably be individually and independently edited, allowing artificial promotion within sortString field 206 as described above, replacement of an erroneously selected ideograph in baseString field 204, or correction of a phonetic spelling within altString field 208.

While the above-described methods assumed that the source and target languages were taken from host system defaults, data may alternatively be entered into baseString 204, sortString 206 and altString 208 for specified source and target languages utilizing the constructor:

```
/************************************************
*
* <P> </P>
*
* <dt> <b> Description: </b> <dd>
* <p> Allocate a new IString. The baseString, sortString and
* altString are entered from the IME for specified target and source
* language and locale. </p>
*
************************************************ public IString(String base,
    String sort,
    String alt,
    String srcLanguage,
    String srcLocale,
    String tgtLanguage,
    String tgtLocale) {
  this.baseString=base;
  this.sortString=sort;
  this.altString=alt;
  this.sourceLocale=srcLocale;
  this.sourceLanguage=srcLanguage;
```

```
this.targetLocale=tgtLocale;
this.targetLanguage=tgtLanguage;
init( );
}
```
In this constructor, the source and target language and locale which are employed to select the characters entered into baseString 204, sortString 206 and altString 208 may be specified. This latter constructor may be employed to create an IString object 202 in other than the host system default language, or in host systems where data for the IString object 202 is received from another system and a local instance is created.

It should be noted that transliteration engine 220 and messaging methods 226 need not necessarily be implemented within an IString class 202 as depicted in FIG. 2, and that IME method 220 need not be implemented separately. Transliteration engine 220 and messaging methods 226 may instead be implemented within separate subclasses which are appropriately constructed and/or invoked by IString class 202 as necessary, while IME 224 may be implemented as a method within IString class 202.

Transliteration engine 220 and IME 224 and are only required by data entry methods 210 to gather input data for IString class 202 objects under certain locale and language property settings. Otherwise, data may be programmatically input into baseString 204, sortString 206, and altString 208 by invoking the proper constructor. The methods which may be invoked by programs at runtime to programmatically get and set fields within IString 202 include:

```
/***********************************************
*
* <P> </P>
*
* <dt> <b> Description: </b> <dd>
* <p> Get the IString baseString. </p>
*
* @returns str String containing the base string
*
************************************************
public String getBaseString( ) {
   return this.baseString;
}
```
This method returns the contents for baseString 204 for an IString object 202. Similar methods return the contents of sortString 206 and altString 208:
```
/***********************************************
*
* <P> </P>
*
* <dt> <b> Description: </b> <dd>
* <p> Get the IString sortString. </p>
*
* @returns str String containing the sort string
*
************************************************
public String getSortString( ) {
   return this.sortString;
}
/***********************************************
*
* <P> </P>
*
* <dt> <b> Description: </b> <dd>
* <p> Get the IString altString. </p>
*
* @returns str String containing the alt string
*
************************************************
public String getAltString( ) {
   return this.altString;
}
```
The methods also include setting baseString 204:
```
/***********************************************
*
* <P> </P>
*
* <dt> <b> Description: </b> <dd>
* <p> Set the IString baseString. </p>
* @param str String containing the base string
*
************************************************
public void setBaseString(String sBase) {
   this.baseString=sBase;
}
```
as well as sortString 206 and altString 208:
```
/***********************************************
*
* <P> </P>
*
* <dt> <b> Description: </b> <dd>
* <p> Set the IString sortString. </p>
*
* @param str String containing the sort string
*
************************************************
public void setSortString(String sSrt) {
   this.sortString=sSrt;
}
************************************************
*
************************************************
* P> </P>
*
* <dt> <b> Description: </b> <dd>
* <p> Set the IString altString. </p>
*
* @param str String containing the alt string
*
************************************************
public void setAltString(String sAlt) {
   this.altString=sAlt;
}
```
In addition to getting and setting baseString 204, sortString 206, and altString 208 for an IString object 202, programs may need to get or set the display locale or language of an IString object 202. Accordingly, other methods are provided to permit a program to get and/or set the locale or language properties of IString data:
```
/***********************************************
*
* <P> </P>
```

```
*
* <dt> <b> Description: </b> <dd>
* <p> Get the locale of the IString data. </p>
*
* @returns loc Locale containing the locale of the data
*
***********************************************
public Locale getLocale( ) {
  Locale loc=new Locale(this.sourceLanguage,
    this.sourceLocale);
  return loc;
}
/***********************************************
*
* <P> </P>
*
* <dt> <b> Description: </b> <dd>
* <p> Set the locale of the IString data. </p>
*
* @param loc Locale of the data
*
***********************************************
public void setLocale(Locale loc) {
  this.sourceLocale=loc.getLocale( );
  this.sourceLanguage=loc.getLanguage( );
}
/***********************************************
*
* <P> </P>
*
* <dt> <b> Description: </b> <dd>
* <p> Get the display language of the IString data. </p>
*
* @returns Display language of the data
*
***********************************************
public String getDisplayLanguage( ) {
  Locale loc=new Locale(this.sourceLanguage,
    this.sourceLocale);
  return loc.getDisplayLanguage( );
}
/***********************************************
*
* <P> </P>
*
* <dt> <b> Description: </b> <dd>
* <p> Get the display locale of the IString data. </p>
*
* @returns Display locale of the data
*
public String getDisplayLocale( ) {
  if(this.sourceLanguage==null&&this.sourceLocale==
    null)
    return null;
  else {
    Locale loc=new Locale(this.sourceLanguage,
      this.sourceLocale);
    return loc.getDisplayLocale( );
  }
}
```

While these methods are available, IString class 202 preferably exhibits a "black box" behavior such that the programmer/user need not know anything about the methods implemented for IString class 202. IString class 202 simply appears as a data type which encapsulates extra information about baseString 204 and also includes some methods for transforming characters from one character set to another. For special cases where the sortString field 206 or altString field 208 are to be exposed to the user in addition to or in lieu of baseString 204, either for editing or for display only, a separate set of controls may be provided.

In the present invention, IString class 202 is employed to effectively transfer human language data across systems employing incongruous languages. The contents of baseString 204 provide a native representation of the text in the default language of the system originating the IString object 202. However, for each system participating in the exchange of data with other systems running in different human languages, the targetLocale property 216 and targetLanguage 218 property of an IString object 202 are preferably set to a common value (e.g., targetLocale="US", targetLanguage="en"). The contents of altString 208 will thus contain a common, cross-language representation of the text string. In systems where the default language of a system receiving an object differs from the language of the contents of baseString 204, IString class object 202 may automatically switch to presenting the contents of altString 208 as the text string to be displayed or processed.

Figure 3:
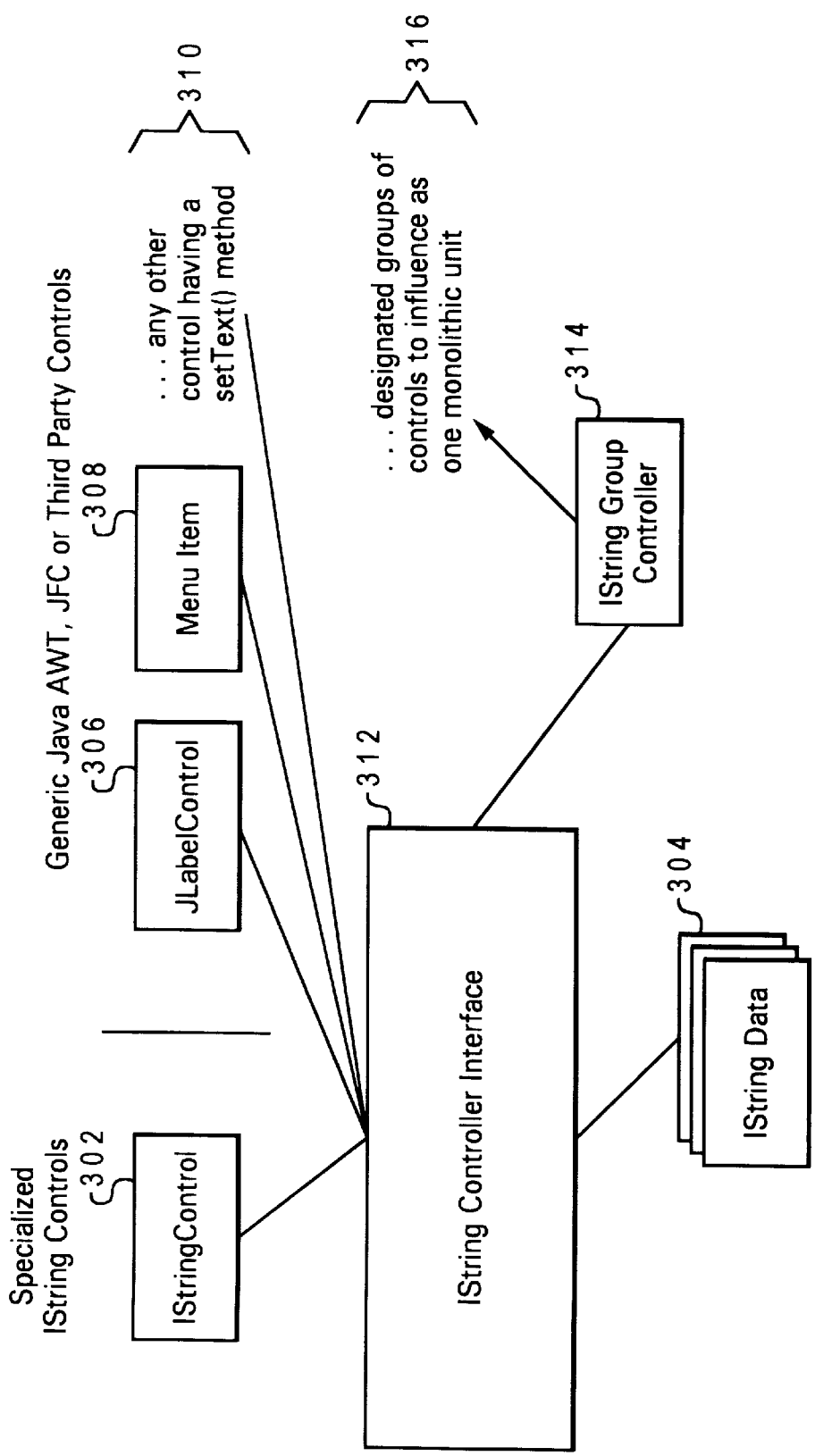
FIG. 3 depicts a diagram of a mechanism for providing control over the display and editing of individual multi-field text class objects or discrete sets of multi-field text class objects in accordance with a preferred embodiment of the present invention.

Referring to FIG. 3, a diagram of a mechanism for providing control over the display and editing of individual multi-field text class objects or discrete sets of multi-field text class objects in accordance with a preferred embodiment of the present invention is depicted. In order to enable all Java Abstract Windowing Toolkit (AWT) controls to use and display IString information, a text manager class, IStringControl 302, and an IString controller interface 312 are defined. IString controller interface 312 intercepts all display requests to IString objects 304, passing the contents of a current display field to a control in response to such display requests. IString controller interface 312 thus allows legacy controls to display the contents of IString objects 304 without a specialized display control.

The constructor for IStringcontrol 302 takes as its parameters an IString class 304 and a Java Foundation Class (JFC) control 306, a menu item 308, or any other control 310 having a setText( ) method. IStringControl 302 is responsible for managing which IString field (baseString, sortString, or altString) is visible in the control which it manages, and for implementing methods to enter or change text within the IString objects 304. IStringControl 302 intervenes in all calls to the setText( ) method of any control, performing the necessary processing to enter text in a field of an IString object 304 utilizing a control.

For each instance of a text control within a user interface dialog, instead of calling the setText( ) method on the JFC control, an IString controller interface 312 and the JFC control are created along with an IStringControl 302 to manage the JFC control. This allows a dialog or frame containing a number of single-valued, text-based controls (e.g., JLabel or JTextField) to show IString values. Additionally, instead of taking a JFC control as one of its constructor parameters, IStringcontrol 302 could take a java.awt.Component instead and look for a setText( ) method employing introspection, making IString support potentially ubiquitous.

The IString controller ("IStringControlActions") interface 312 is also defined with methods for configuring and querying IStringControl 302. Such methods include:

public void setText(IString text),
public IString getText( ),
public void setVisibleField(int field),
public int getVisibleField( ),
setPopupEnabled(boolean enabled), and
isPopupEnabled( ).

The getText( ) and getVisibleField( ) methods are not voided within controller interface 312 to allow controller interface 312 to pass the contents of the current display field ("visibleField") to a legacy control, including Java AWT controls such as JLabel Control 306, JFC controls such as Menu Item 308, or any other control 310 including a getText( ) method.

The setText( ) and setVisibleField( ) methods within controller interface 312 are;voided since a specialized IString control 302 should intervene in any calls to a setText( ) method within a legacy control. The parameter "field" in the methods listed above is either IStringControl.BASE, IStringControl.SORT, or IStringControl.ALT. The last two methods listed above determine whether popup displays are shown with IString field contents.

Additionally, a grouping class 314, analogous to ButtonGroup and called IStringControlGroup in the example, may be defined which implements the IStringControlOptions method. Instances 316 of IStringcontrol 302 may be added to grouping class 314 to create a context, such as a dialog or an entire application, within which all controls are configurable at once. With the structure shown in FIG. 3 and described above, the application and even the programmer have very little extra work to perform in order to utilize IString data within an application, although a richer set of methods for special operations may be utilized if desired.

Controller interface 312 also provides a mechanism for changing the display of IString data via messaging. IString data objects 304, controls 302, 306, 308, and 310, and group controller 314 all may register as listeners with controller interface 312 for messages which contain the language and/or locale code, such as a language change message, a locale change message, or a display change message. Language and locale change messages may alter the language and locale property settings within the underlying system, while a display change message may simply alter the language and/or locale (separately or jointly) employed to select IString data display fields without altering the underlying system language and locale properties.

The language, locale, and display change message(s) may be initiated either by a user through a dialog to controller interface 312 or by an application sending an appropriate message. When a new language and/or locale is selected, all enabled subscribers may choose to react to the message by reloading human language and reformatting locale specific data. The language, locale, and display change messages may invoke one or more messaging methods 224 within an IString object 202 depicted in FIG. 2.

When a language change message is received, IString objects 302 operate on their data logically. Some IString objects 302 may have no behavior change for a change of language, but do for a change of locale. For example, a numeric date display would change its presentation format depending on the locale selected (e.g., from U.S. to European), but the digits would not change. Other objects will have behavior changes for both language and locale, as in a text date display which changes both the presentation format and the textual month name and weekday name.

Figure 4A:
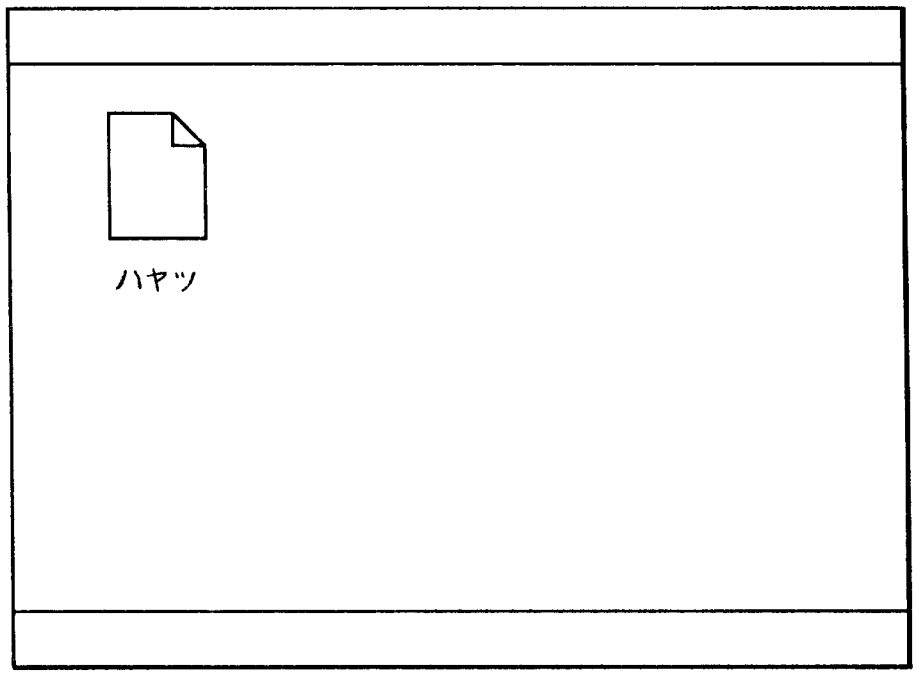
FIGS. 4A–4B are user interface diagrams for a process controlling the display of multi-field text class objects in accordance with a preferred embodiment of the present invention.
Figure 4B:
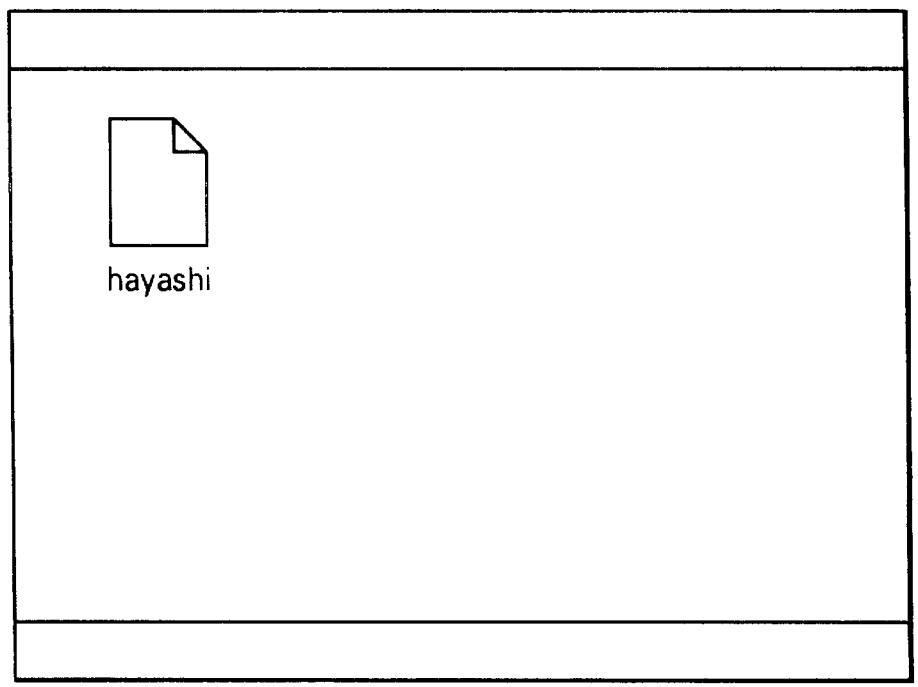

Referring to FIGS. 4A–4B, user interface diagrams for a process controlling the display of multi-field text class objects in accordance with a preferred embodiment of the present invention are illustrated. FIG. 4A illustrates the user interface where the object name is contained within with a multi-field text string object with the contents of a first field displayed, which in the exemplary embodiment is the sortString field containing Katakana characters phonetically spelling the Kanji symbol with the baseString (not shown).

The control depicted in FIG. 3 and described above may be utilized to control the display of the multi-field text string object. FIG. 4B illustrates the user interface displaying the same object where the display field of the object name has been changed to the contents of the altString field.

Figure 5A:
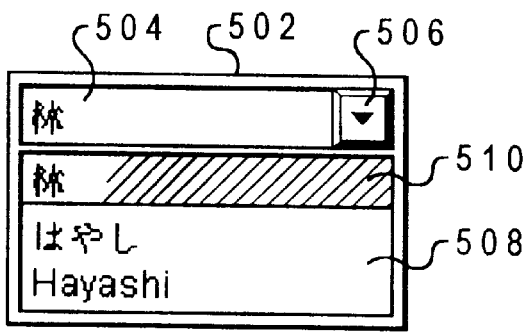
FIGS. 5A–5B depict a user interface control for selecting or editing a current display field for a multi-field field text string object in accordance with a preferred embodiment of the present invention.
Figure 5B:
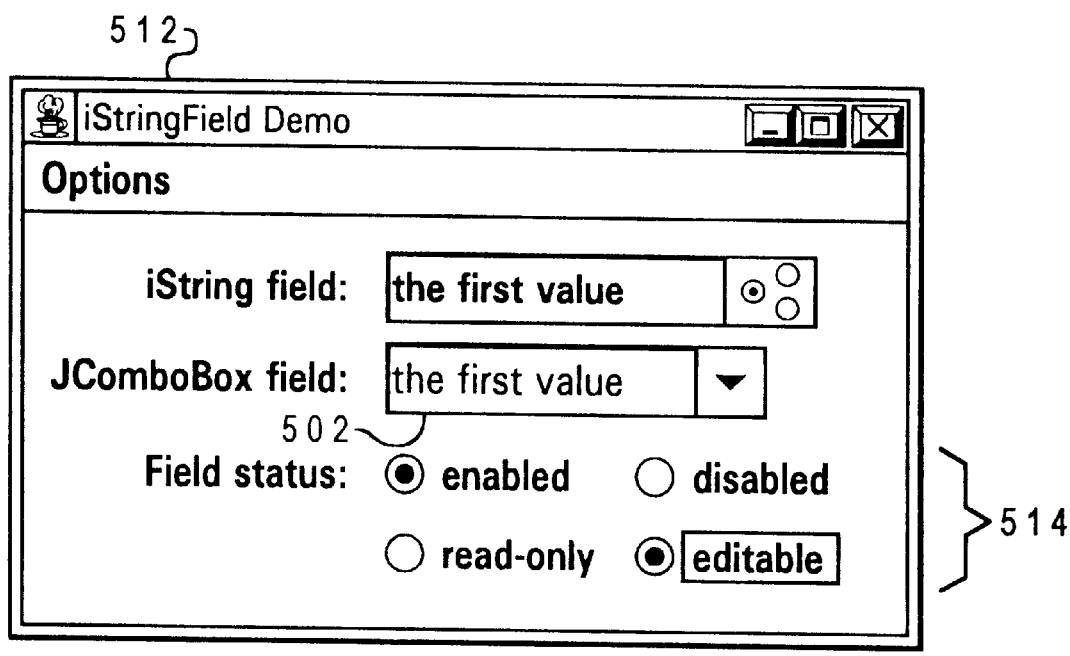

With reference now to FIGS. 5A–5B, a user interface control for selecting or editing a current display field for a multi-field text string object in accordance with a preferred embodiment of the present invention is illustrated. FIGS. 5A–5B are intended to be read in conjunction with FIGS. 2 and 3. Control 502 is preferably a specialized IString control 302 capable of requesting the contents of any field within an IString object.

Control 502 includes a display area 504 for displaying the contents of the current display field of an IString object 202 or 304, as well as a selection control 506 for initiating selection of a different field to display. The contents of the currently selected display field of the IString object 202 or 304 may be retrieved by the getVisibleField method for display. A visibleField parameter within IString object 202 or 304 identifies which field, baseString 204, sortString 206, or altString 208, is currently selected for display. Based on the visibleField parameter, the getVisibleField method effectively performs a getText(field) process on the IString object 202 or 304, where the "field" parameter is IString.BASE, IString.SORT, or IString.ALT, to retrieve the string within the field currently selected for display.

Selection control 506 may be a conventional downward-pointing arrow which is actuated by "clicking" on selection control 506, manipulating a pointing device until the cursor is over selection control 506, and then actuating the pointing device or a particular button on the pointing device. When actuated, selection control 506 produces a drop-down box 508 containing all three fields of the IString object 202 or 304 in the order baseString 204, sortString 206, and altString 208. The contents of all three fields may be retrieved by performing a plurality of getText( ) methods on IString.BASE, IString.SORT, and IString.ALT. The three strings may then be displayed as an ordered list within drop-down box 508 in accordance with the known art.

As with conventional pull-down menus and drop-down boxes, an entry within drop-down box 508 over which the cursor is presently located is highlighted by a bar 510. The user may select a different field for display by clicking on the desired entry within drop-down box 508. Control 502 then performs a setVisibleText method to alter the visibleText parameter to IString.BASE, IString.SORT, or IString.ALT as appropriate, then reloads display area 504 with the contents of the newly-selected current display field.

A user may edit the contents of a currently selected display field without altering the contents of the remaining fields by double-clicking on the display area 504 while the field to be edited is displayed. The user-specified text string, which may include any characters, is stored in the currently displayed field with a setText( ) method. To edit the contents of a field which is not currently displayed, the user employs selection control 506 to select the field to be edited as the current display field and then edits the field within display area 504.

Control 502 may be suitably implemented within status bars or, as shown in FIG. 5B, may be integrated into a dialog box 512 with other controls. As shown, the other controls may include, for example, radio buttons 514 controlling whether selection control 506 is enabled or disabled and whether the contents of display area 504 are read-only or editable. In this manner, utilizing the corresponding parameters of selection control 506 and display area 504 alone or in combination, control 502 may prevent the user from altering the current display field for a specific IString object, from editing the contents of any field with a specific IString object, or from editing the contents of a specific field within a specific IString object.

Figure 6:
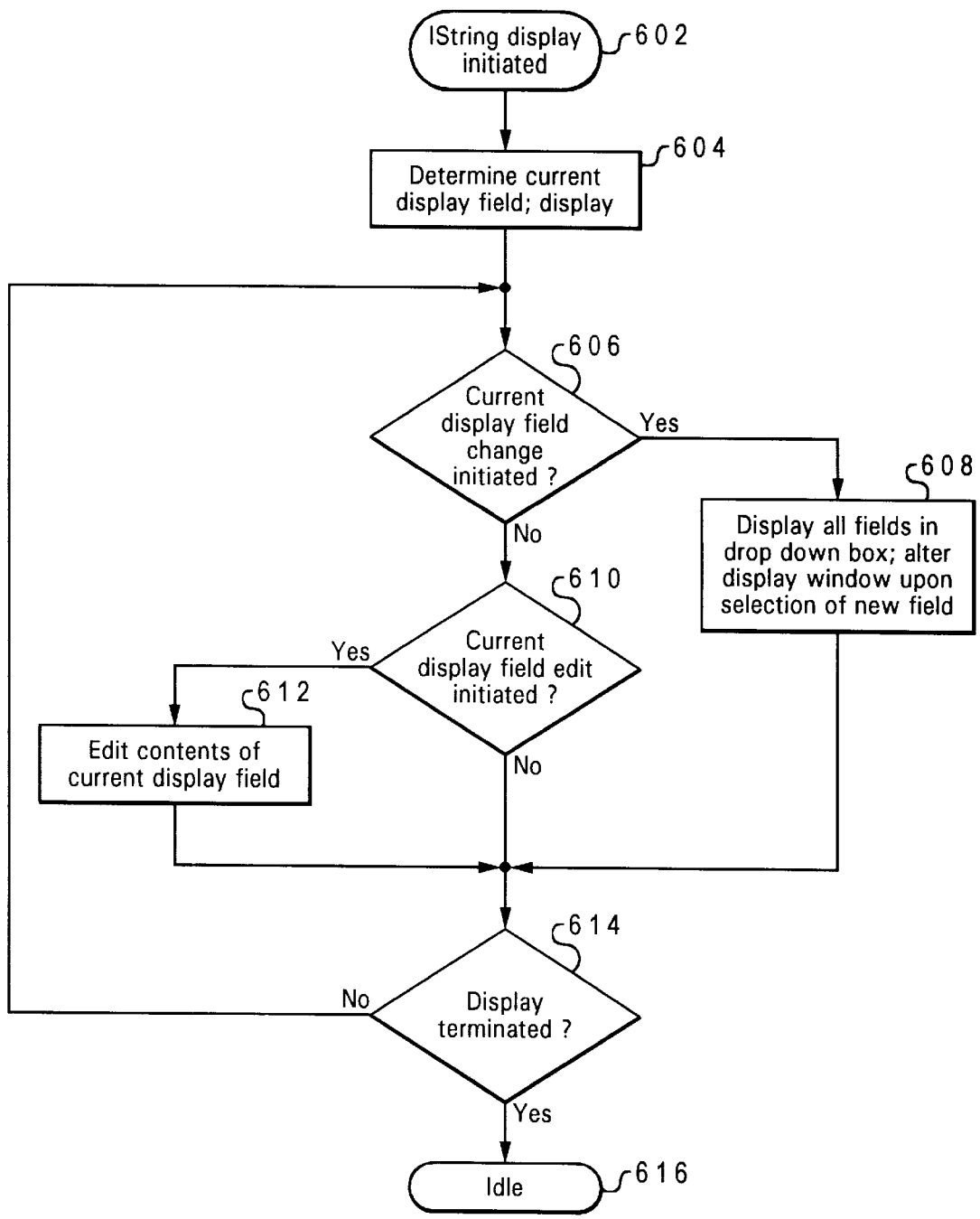
FIG. 6 is a high level flowchart for the operation of a user control for selectively displaying or editing any field within a multi-field text string in accordance with a preferred embodiment of the present invention.

With reference now to FIG. 6, a high level flowchart for the operation of a user control for selectively displaying or editing any field within a multi-field text string in accordance with a preferred embodiment of the present invention is depicted. The process illustrates is a process by which control 502 depicted in FIG. 5 operates. The process begins at step 602, which depicts display of an IString object with user control 502 being initiated, then passes to step 604, which illustrates determining which field is the current display field and displaying the contents of that field within the control.

The process next passes to step 606, which depicts a determination of whether a change in the display field has been initiated, as by a user actuating selection control 506. If so, the process proceeds to step 608, which illustrates displaying all fields for the IString object in drop-down box 508 in order, and altering the contents of display window 504 if a new field is selected as the current display field. Drop-down box 508 is removed once the user has selected a field for display.

If no change in the current display field is initiated, the process proceeds instead to step 610, which depicts a determination of whether an edit of the contents of the current display field has been initiated, as by the user double-clicking on display window 504. If so, the process proceeds to step 612, which illustrates editing the contents of the current display field using a simple editor, the transliteration engine, or the IME depending on the source and target languages of the IString and on the field being edited.

From either of steps 608 or 612, the process next passes to step 614, which depicts a determination of whether the display of an IString object with control 502 has been terminated. If not, the process returns to step 606 to await further user initiation of a display field change or edit. If so, however, the process proceeds instead to step 616, which illustrates the process becoming idle until another display of an IString object utilizing control 502 is initiated.

The user control of the present invention allows a user to derive benefits of the IString class by switching views between different fields of an IString object to see different representations of the text string. A user unable to recognize, understand or pronounce a text string based on a representation stored within the current display field may which to another representation, such as a phonetic spelling of the text string. This allows text strings entered in one language to be recognized, understood, or pronounced by users unfamiliar with the language in which the text string was entered.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing media used to actually carry lout the distribution. Examples of computer usable mediums include: nonvolatile, hard-coded type media such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of changing the display of a multi-field text string, comprising:

providing an interface between a user control and a multi-field text string object having separate fields each containing a different representation of a text string;

displaying contents of a current display field for the multi-field text string object in the user control, wherein the step of displaying contents includes:

displaying a first character string from a first field comprising within the multi-field text string object characters employed by a first human language in which the text string was entered;

displaying a second character string from a second field within the multi-field text string object comprising characters employed by the first human language that phonetically spell the text string; and displaying a third character string from a third field within the multi-field text string object comprising characters employed by a second human language that phonetically spell the text string;

providing a selection control for selectively altering a current display field for the multi-field text string object; and responsive to user actuation of the selection control, displaying contents of all fields within the multi-field text string object as a list for user selection.

2. The method of claim 1, wherein the step of providing an interface between a user control and a multi-field text string object having separate fields each containing a different representation of a text string further comprises:

storing a first character string comprising characters from a first character set employed by a first human language to represent the text string in the first human language within a first field of the multi-field text string object; and storing a second character string comprising characters from a second character set employed by a second human language to represent the text string in the second human language within a second field of the multi-field text string object.

3. The method of claim 1, wherein the step of displaying contents of a current display field for the multi-field text string object in the user control further comprises;

identifying which field of the multi-field text string object is the current display field;

retrieving a character string from the identified field; and displaying the retrieved character string in a display area within the user control.

4. The method of claim 1, further comprising:

responsive to user selection of a field within the multi-field text string object from the list as a new current display field, changing the current display field within the multi-field text string object to the new current display field.

5. The method of claim 4, further comprising:

retrieving a character string from the new current display field; and displaying the retrieved character string in a display area within the user control.

6. The method of claim 1, further comprising:

displaying a character string from the current display field in a display area within the user control;

providing an edit control within the user control for selectively editing contents of the current display field;

responsive to user actuation of the selection control, receiving a new character string for entry in the current display field; and storing the new character string in the current display field within the multi-field text string object.

7. The method of claim 1, wherein the step of displaying contents of all fields within the multi-field text string object as a list for user selection further comprises:

displaying a first character string from a first field comprising within the multi-field text string object characters employed by a first human language in which the text string was entered; and displaying a second character string from a second field within the multi-field text string object comprising characters which sound-map to characters within the first character string.

8. A system for changing the display of a multi-field text string, comprising:

means for providing an interface between a user control and a multi-field text string object having separate fields each containing a different representation of a text string;

means for displaying contents of a current display field for the multi-field text string object in the user control, wherein the step of displaying contents includes:

means for displaying a first character string from a first field comprising within the multi-field text string object characters employed by a first human language in which the text string was entered;

means for displaying a second character string from a second field within the multi-field text string object comprising characters employed by the first human language that phonetically spell the text string; and means for displaying a third character string from a third field within the multi-field text string object comprising characters employed by a second human language that phonetically spell the text string;

means for providing a selection control for selectively altering a current display field for the multi-field text string object; and means, responsive to user actuation of the selection control, for displaying contents of all fields within the multi-field text string object as a list for user selection.

9. The system of claim 8, wherein the means for providing an interface between a user control and a multi-field text string object having separate fields each containing a different representation of a text string further comprises:

means for storing a first character string comprising characters from a first character set employed by a first human language to represent the text string in the first human language within a first field of the multi-field text string object; and means for storing a second character string comprising characters from a second character set employed by a second human language to represent the text string in the second human language within a second field of the multi-field text string object.

10. The system of claim 8, wherein the means for displaying contents of a current display field for the multi-field text string object in the user control further comprises:

means for identifying which field of the multi-field text string object is the current display field;

means for retrieving a character string from the identified field; and means for displaying the retrieved character string in a display area within the user control.

11. The system of claim 8, further comprising:

means, responsive to user selection of a field within the multi-field text string object from the list as a new current display field, for changing the current display field within the multi-field text string object to the new current display field.

12. The system of claim 11, further comprising:

means for retrieving a character string from the new current display field; and means for displaying the retrieved character string in a display area within the user control.

13. The system of claim 8, further comprising:

means for displaying a character string from the current display field in a display area within the user control;

means for providing an edit control within the user control for selectively editing contents of the current display field;

means, responsive to user actuation of the selection control, for receiving a new character string for entry in the current display field; and means for storing the new character string in the current display field within the multi-field text string object.

14. The system of claim 8, wherein the means for displaying contents of all fields within the multi-field text string object as a list for user selection further comprises:

means for displaying a first character string from a first field comprising within the multi-field text string object characters employed by a first human language in which the text string was entered; and means for displaying a second character string from a second field within the multi-field text string object comprising characters which sound-map to characters within the first character string.

15. A computer program product within a computer usable medium for changing the display of a multi-field text string, comprising:

instructions for providing an interface between a user control and a multi-field text string object having separate fields each containing a different representation of a text string;

instructions for displaying contents of a current display field for the multi-field text string object in the user control, wherein the step of displaying contents includes:

instructions for displaying a first character string from a first field comprising within the multi-field text string object characters employed by a first human language in which the text string was entered;

instructions for displaying a second character string from a second field within the multi-field text string object comprising characters employed by the first human language that phonetically spell the text string; and instructions for displaying a third character string from a third field within the multi-field text string object comprising characters employed by a second human language that phonetically spell the text string;

instructions for providing a selection control for selectively altering a current display field for the multi-field text string object; and instructions, responsive to user actuation of the selection control, for displaying contents of all fields within the multi-field text string object as a list for user selection.

16. The computer program product of claim 15, wherein the instructions for providing an interface between a user control and a multi-field text string object having separate fields each containing a different representation of a text string further comprises:

instructions for storing a first character string comprising characters from a first character set employed by a first human language to represent the text string in the first human language within a first field of the multi-field text string object; and instructions for storing a second character string comprising characters from a second character set employed by a second human language to represent the text string in the second human language within a second field of the multi-field text string object.

17. The computer program product of claim 15, wherein the instructions for displaying contents of a current display field for the multi-field text string object in the user control further comprises:

instructions for identifying which field of the multi-field text string object is the current display field;

instructions for retrieving a character string from the identified field; and instructions for displaying the retrieved character string in a display area within the user control.

18. The computer program product of claim 15, further comprising:

instructions, responsive to user selection of a field within the multi-field text string object from the list as a new current display field, for changing the current display field within the multi-field text string object to the new current display field.

19. The computer program product of claim 18, further comprising:

instructions for retrieving a character string from the new current display field; and instructions for displaying the retrieved character string in a display area within the user control.

20. The computer program product of claim 15, further comprising:

instructions for displaying a character string from the current display field in a display area within the user control;

instructions for providing an edit control within the user control for selectively editing contents of the current display field;

instructions, responsive to user actuation of the selection control, for receiving a new character string for entry in the current display field; and instructions for storing the new character string in the current display field within the multi-field text string object.

21. The computer program product of claim 15, wherein the instructions for displaying contents of all fields within the multi-field text string object as a list for user selection further comprises:

instructions for displaying a first character string from a first field comprising within the multi-field text string object characters employed by a first human language in which the text string was entered; and instructions for displaying a second character string from a second field within the multi-field text string object comprising characters which sound-map to characters within the first character string.

\* \* \* \* \*